Sept. 8, 1925.

A. A. POLLOCK 1,553,104

SYSTEM OF ELECTRIC DISTRIBUTION

Filed Dec. 10, 1923

Inventor:
Alan A. Pollock;
by Alexander S. ?
His Attorney.

Patented Sept. 8, 1925.

1,553,104

UNITED STATES PATENT OFFICE.

ALAN ADAIR POLLOCK, OF LEAMINGTON SPA, ENGLAND, ASSIGNOR TO GENERAL ELECTRIC COMPANY, A CORPORATION OF NEW YORK.

SYSTEM OF ELECTRIC DISTRIBUTION.

Application filed December 10, 1923. Serial No. 679,725.

*To all whom it may concern:*

Be it known that I, ALAN ADAIR POLLOCK, a subject of the British Empire, residing at Leamington Spa, England, have invented certain new and useful Improvements in Systems of Electric Distribution, of which the following is a specification.

My invention relates to systems of electric distribution and more particularly to systems for maintaining constant the voltage of a circuit which is supplied from a circuit of variable voltage.

My invention is of particular utility on electric railways where the supply or trolley voltage is subject to considerable variation and it is necessary to supply a substantially constant voltage to certain auxiliary apparatus such as lamps, fans, heating devices and the like. Further more the voltage which is supplied to these auxiliary devices usually is much lower than the trolley voltage.

One object of my invention is to provide an improved arrangement whereby a substantially constant voltage may be obtained from a variable voltage circuit. In accordance with my invention I connect the armature windings of two dynamo-electric machines in series across the variable voltage circuit and arrange the magnetic circuits and field windings of the two machines so that the voltage across one of the armature windings remains substantially constant for all variations in the voltage of the variable voltage circuit.

My invention will be better understood from the following description, taken in connection with the accompanying drawing, and its scope will be pointed out in the appended claims.

Figure 1:
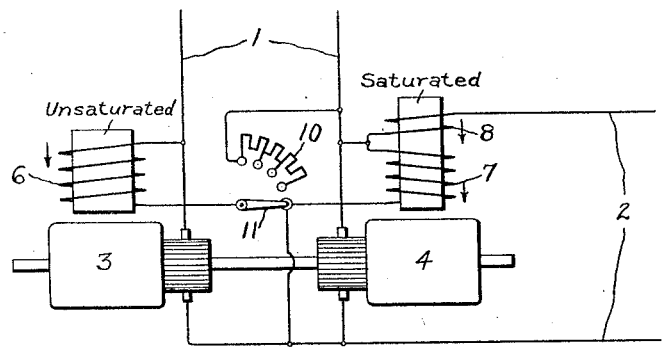
Figure 2:
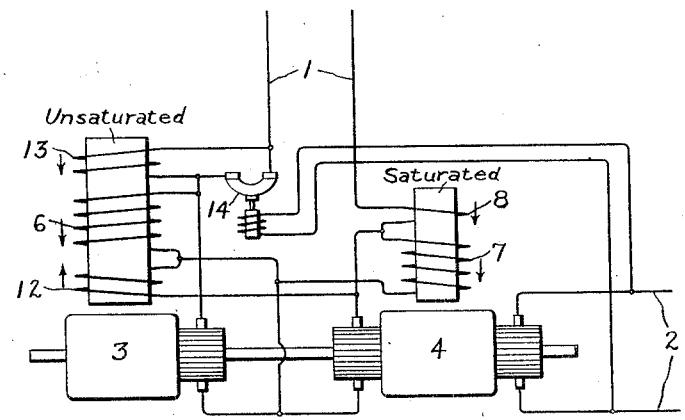

In the accompanying drawing, Fig. 1 shows one embodiment of my invention and Fig. 2 is a modification of the embodiment shown in Fig. 1.

Referring to Fig. 1, 1 represents a variable voltage direct current circuit which may be supplied from any suitable source, not shown, and 2 represents a direct current circuit to which it is desirable to supply current at a constant voltage from the variable voltage circuit 1. For accomplishing this result two direct current dynamo-electric machines 3 and 4 are provided which have their armature windings connected in series across the variable voltage circuit 1, and the circuit 2 is connected across the armature of the machine 4.

The machine 3 is provided with a field winding 6 which is connected so that its excitation varies with the voltage of the circuit 1. Preferably the winding 6 is connected in shunt with the armature winding of the machine 3. Also the field structure of the machine 3 is preferably so designed that the magnetic circuit is not saturated and therefore changes in the field current produce large changes in the amount of flux in the magnetic circuit.

The machine 4 is provided with a field winding 7 which is so connected that its excitation is substantially constant. Preferably the field winding 7 is connected in shunt with the armature winding of the machine 4 since the voltage across this armature winding is substantially constant. The field structure of the machine 4 is so designed that the magnetic circuit is saturated and therefore changes in the field current produce very small changes in the amount of flux in the magnetic circuit of the machine.

Since the magnetic circuit of the machine 3 is unsaturated and the magnetic circuit of the machine 4 is saturated it is evident that the excitation of the machine 3 varies very much more than the excitation of the machine 4 when a given change in the voltage of the circuit 1 occurs. For example if the voltage across the circuit 1 decreases, the voltage across the armature winding of the machine 3 decreases very much more than the voltage across the armature winding of the machine 4 because the magnetic circuit of the machine 3 is being worked below the bend of the saturation curve, whereas the magnetic circuit of the machine 4 is being worked over the bend of the saturation curve. By means of two machines constructed and arranged in this manner, practically the entire variation of the voltage of the circuit may be compensated for by the machine 3, which may be considered as a variable voltage bucker, while the voltage across the armature winding of the machine 4 remains substantially constant. Therefore by connecting the circuit 2 across the armature of the machine 4, a substantially constant voltage may be maintained across the circuit so that it may be used to supply any auxiliary apparatus requiring a substantially constant voltage.

In order to help maintain the voltage of the circuit 2 constant with varying load currents a compound wound winding 8, connected in series with the circuit 2, may be provided on the machine 4.

For starting the machines a rheostat 10 may be provided which is so connected and arranged that when the arm 11 of the rheostat is in its left-hand or starting position the field winding is connected across the circuit 1 so that the magnetic circuit of the machine 3 is saturated. As the arm is moved to the right the resistance in series with the field winding 6 is increased so as to decrease the excitation of the machine 3 until the running position is reached when the field winding 6 is disconnected from the circuit 1 and is connected across the armature of the machine.

If the voltage of the circuit 2 is low compared with voltage of the circuit 1, a second armature winding may be provided on the armature of the machine 4 and connected to the circuit 2 by means of a separate commutator as shown in the modification of my invention in Fig. 2. Since the voltage impressed upon the main armature winding and the field winding 7 of the machine 4 remains substantially constant and the speed of the machine remains constant as the voltage of the circuit 1 varies, the voltage induced in this second armature winding is constant. Also instead of connecting the compound winding 8 in series with the circuit 2, the winding may be connected in series with the circuit 1 as shown in Fig. 2 since the current in this circuit varies with the current supplied to the circuit 2.

Furthermore, in order to improve the regulation, a differential field winding 12 may be provided on the machine 3 and connected to any suitable source of constant potential. As shown in Fig. 2, this field winding is connected in shunt with the main armature winding of the machine 4. In order to compensate for the opposing magnetomotive force produced by the current through the winding 12, the ampere turns of the main field winding 6 have to be increased. Consequently this combination of windings produces a greater variation in the field strength of the machine 3 for a given variation in the voltage of the circuit 1 than the single field winding 6 shown in Fig. 1.

A different arrangement for use in starting the machines is also shown in the modification shown in Fig. 2. A compound winding 13, connected in series with the circuit 1, is provided on the machine 3 so that during the starting period this compound winding, together with the compound winding 8 on the machine 4, produce a high starting torque.

Since the compound winding 13 is needed only during the starting period it is desirable that this winding should be rendered inoperative after the machines have been started. For accomplishing this result a switch 14 is provided which, when closed, short circuits the winding 13. The coil of this switch is connected across the circuit 2 and is so designed that the switch 14 is not closed until the voltage across the circuit 2 has built up to approximately its normal value. If the machines are shut down due to a failure in the voltage of the circuit 1, the switch 14 opens and the machines remain shut down until the voltage across the circuit 1 is restored when the machines automatically start up.

While I have shown and described several modifications of my invention, I do not desire to be limited thereto, but seek to cover in the appended claims all modifications that fall within the true spirit and scope of my invention.

What I claim as new and desire to secure by Letters Patent of the United States is:—

1. In a system of the class described for obtaining a substantially constant voltage from a variable voltage direct current circuit, two dynamo electric machines having their armature windings connected in series across said variable voltage circuit and having field windings connected in shunt with their respective armature windings, characterized by the fact that the magnetic circuit of one of the machines is saturated and the magnetic circuit of the other machine is unsaturated whereby the voltage across the armature winding of one of said dynamo electric machines is substantially constant.

2. In a system of the class described for obtaining a constant voltage from a variable voltage direct current circuit, a dynamo electric machine having an armature winding and a saturated magnetic circuit, and a second dynamo electric machine having its rotor connected to the rotor of said first mentioned dynamo electric machine, an armature winding connected in series with said first mentioned armature winding across the variable voltage circuit, an unsaturated magnetic circuit and a field winding connected across the armature winding of said second dynamo electric machine, whereby the voltage across the armature winding of said first mentioned machine is substantially constant.

3. Means for obtaining a substantially constant voltage from a variable voltage direct current circuit comprising a shunt wound dynamo electric machine having its armature winding connected to the variable voltage circuit, and a second dynamo electric machine having its armature winding connected in series with the armature winding of said shunt wound dynamo electric machine, an unsaturated magnetic structure, a shunt field winding, and a differentially wound field winding arranged to be energized at a substantially constant value, whereby the voltage across the armature winding of said shunt wound machine is substantially constant.

4. Means for obtaining a substantially constant voltage from a variable voltage direct current circuit comprising a shunt wound dynamo electric machine having its armature winding connected to the variable voltage circuit, and a second dynamo electric machine having its armature winding connected in series with the armature winding of said shunt wound dynamo electric machine, its rotor connected to the rotor of said shunt wound direct current machine so that said rotors rotate together, an unsaturated magnetic structure, a shunt field winding, and a differentially wound field winding connected in shunt to the armature winding of said shunt wound machine, whereby the voltage across the armature winding of said shunt wound dynamo electric machine is substantially constant.

5. In a system of the class described for obtaining a substantially constant voltage from a variable voltage direct current circuit, a dynamo electric machine having an armature winding and a saturated magnetic circuit, a second dynamo electric machine having an armature winding connected in series with said first mentioned armature winding across the variable voltage circuit and an unsaturated magnetic circuit whereby the voltage across the armature winding of said first mentioned machine is substantially constant, a field winding for said second machine adapted to be connected in series with the armature winding, and means responsive to an electrical condition of said first mentioned machine for controlling the excitation of said field winding.

6. In a system of the class described for obtaining a substantially constant voltage from a variable voltage direct current circuit, a dynamo electric machine having two armature windings, a series field winding, and a saturated magnetic circuit, a second dynamo electric machine having an armature winding connected in series with one of the armature windings of said first mentioned machine across said variable voltage circuit, and an unsaturated magnetic circuit whereby the voltage across the armature winding of said first mentioned machine is substantially constant, a field winding for said second machine adapted to be connected in series with the armature winding thereof, and means responsive to the voltage across the armature winding of said first mentioned machine which is not connected in series with the armature winding of the second machine for controlling the excitation of the field winding of said second machine.

In witness whereof, I have set my hand.

ALAN ADAIR POLLOCK.